United States Patent
Iatan

(10) Patent No.: US 9,676,130 B2
(45) Date of Patent: Jun. 13, 2017

(54) INJECTION MOLDING APPARATUS FOR STRUCTURED OPTICAL PARTS

(71) Applicant: DBM REFLEX ENTERPRISES INC., Laval (CA)

(72) Inventor: George Iatan, Saint-Lambert (CA)

(73) Assignee: DBM REFLEX ENTERPRISES INC., Laval, Quebec (CA)

( * ) Notice: Subject to any disclaimer, the term of this patent is extended or adjusted under 35 U.S.C. 154(b) by 32 days.

(21) Appl. No.: 14/853,173

(22) Filed: Sep. 14, 2015

(65) Prior Publication Data

US 2016/0001479 A1 Jan. 7, 2016

Related U.S. Application Data

(63) Continuation of application No. PCT/CA2014/050264, filed on Mar. 14, 2014.

(60) Provisional application No. 61/783,306, filed on Mar. 14, 2013.

(51) Int. Cl.
| | |
|---|---|
| *B29C 45/34* | (2006.01) |
| *B29D 11/00* | (2006.01) |
| *B29L 11/00* | (2006.01) |
| *B29C 45/26* | (2006.01) |
| *B29C 33/10* | (2006.01) |

(52) U.S. Cl.
CPC ........ *B29C 45/34* (2013.01); *B29D 11/00269* (2013.01); *B29C 33/10* (2013.01); *B29C 45/263* (2013.01); *B29L 2011/00* (2013.01); *B29L 2011/005* (2013.01)

(58) Field of Classification Search
CPC ........ B29C 33/10; B29C 45/263; B29C 45/34
See application file for complete search history.

(56) References Cited

U.S. PATENT DOCUMENTS

| | | | | |
|---|---|---|---|---|
| 3,443,281 | A | * 5/1969 | Walby | ............. B29C 33/302 249/117 |
| 3,657,045 | A | * 4/1972 | Brudy | ............. B29C 33/302 156/242 |
| 4,170,616 | A | 10/1979 | Jebens | |
| 5,409,362 | A | 4/1995 | Neu | |
| 6,171,095 | B1 | 1/2001 | Balint et al. | |
| 6,367,765 | B1 | 4/2002 | Wieder | |
| 6,527,538 | B1 | 3/2003 | Pickutoski et al. | |

(Continued)

FOREIGN PATENT DOCUMENTS

| | | |
|---|---|---|
| JP | 2011083952 A | 4/2011 |
| WO | 2014139017 A1 | 9/2014 |

OTHER PUBLICATIONS

Machine translation in English of JP2011083952.
International Preliminary Report on Patentability (IPRP)—Chapter I of PCT/CA2014/050264 (report dated Sep. 15, 2015).

*Primary Examiner* — Jill Heitbrink
(74) *Attorney, Agent, or Firm* — Ipaxio S.E.N.C.

(57) ABSTRACT

The injection molding apparatus is provided for making highly accurate optical parts having structured reflective or deflecting optical surfaces. The apparatus includes a removable mold insert made of two or more mold insert segments. The mold insert segments are juxtaposed at mating lateral planar surfaces to form a reversed structured surface. The mold insert segments also includes a gas venting circuit having conduits formed when the mold insert segments are juxtaposed. A cooling circuit is provided in the mold insert segments.

17 Claims, 8 Drawing Sheets

(56) References Cited

U.S. PATENT DOCUMENTS

| | | |
|---|---|---|
| 6,746,634 B2 | 6/2004 | Shimakura |
| 7,102,820 B2 | 9/2006 | Peterson et al. |
| 7,762,165 B2 | 7/2010 | Kimura |
| 7,862,752 B2 | 1/2011 | Schwenk |
| 8,184,386 B2 | 5/2012 | Tobita et al. |
| 2008/0018008 A1 | 1/2008 | Edwards |
| 2010/0323105 A1 | 12/2010 | Hosoe |
| 2012/0183639 A1 | 7/2012 | Yankov et al. |

\* cited by examiner

INJECTION MOLDING APPARATUS FOR STRUCTURED OPTICAL PARTS

CROSS-REFERENCE TO PRIOR APPLICATIONS

The present application is a continuation of PCT patent application No. PCT/CA2014/050264 filed on 14 Mar. 2014. No. PCT/CA2014/050264 claims the benefit of U.S. patent application No. 61/783,306 filed on 14 Mar. 2013. The contents of all these prior applications are hereby incorporated by reference in their entirety.

TECHNICAL FIELD

The technical field relates generally to injection molding of optical parts having structured optical surfaces. More specifically, it relates to injection molding apparatuses and components therefor in which the mold inserts include gas venting features capable of improving the surface accuracy during the molding.

BACKGROUND

Fresnel lenses are examples of optical parts having deflecting or reflecting structured optical surfaces. These structured optical surfaces often include a multitude of juxtaposed sections, each section having, for instance, one or more circumscribed facets or the like. Fresnel lenses can be made much thinner than conventional non-structured lenses of equivalent power. They are used in a wide range of applications, such as for visual and image displays, solar light concentrators, automotive and other lighting devices and image capturing systems, to just name a few. Other kinds of optical parts having similar optical deflecting or reflecting structured surfaces exist as well.

Examples of various optical parts can be found for instance in U.S. Pat. No. 4,170,616, U.S. Pat. No. 6,171,095, U.S. Pat. No. 6,746,634, U.S. Pat. No. 7,102,820, U.S. Pat. No. 7,762,165, U.S. Pat. No. 8,184,386, JP-2011083952 and US-2010/0323105.

Injection molding is one of the manufacturing processes that can be used to manufacture optical parts having structured optical surfaces. It uses a molten material, generally a molten plastic material, to form the optical parts and their structured optical surfaces. During the injection molding process, the molten material is injected at relatively high temperatures and using high injection pressures. Gas present in the mold cavity is vented out as the molten material is injected therein. Examples can be found for instance in U.S. Pat. No. 6,367,765, U.S. Pat. No. 6,527,538, U.S. Pat. No. 7,862,752 and US-2008/0018008.

High pressures are maintained when the molten material cools inside the mold cavity to form the structured optical surface as accurately as possible. The molten material is then pressed again a negative of the structured surface until it solidifies.

Injection molding has some advantages over other manufacturing processes but injection molding issues can have a negative impact on the quality of the resulting optical parts, for instance in terms surface accuracy. The structured optical surfaces of some optical parts can be relatively complex to manufacture, particularly when they have a multitude of sections with facets having very sharp angles between them.

One of the difficulties in injection molding optical parts having structured optical surfaces is due to the presence of small residual gas pockets trapped at some locations in the mold cavity during the molding. Small amounts of the gases always tend to remain within the mold cavity, for instance where two adjacent sections of the structured surface meet with an acute angle and where the radius is very small. Gas pockets can also form where two adjacent sections meet at a right or obtuse angle. There are often a large number of locations where gas pockets can form on each optical part and they prevent the molten material from reaching some very small portions of the mold cavity.

Several applications require stringent tolerances and a very high accuracy of the structured optical surface, for instance of the shape, curvatures and/or angles. This high accuracy can mitigate diffraction of white light or monochromatic light, for instance. However, the very small radius of some of these designs can be very difficult to obtain using these known injection molding processes because of the trapped gas pockets.

Another challenge is the need of performing faster maintenance the mold inserts. Providing injection molding apparatuses with very complex gas venting arrangements can lead to costly and time consuming maintenance operations, especially when most of the gas venting circuit is deeply embedded into the body of the parts. A gas venting circuit that cannot be cleaned easily and/or completely will be less efficient and this may eventually impact the quality of the molded optical parts.

Clearly, room for improvements still exists in this area of technology.

SUMMARY

There is provided an injection molding apparatus for making highly accurate optical parts having structured reflective or deflecting optical surfaces. This injection molding apparatus includes a removable mold insert having a reversed structured surface that includes gas venting features capable of removing small residual gas pockets. This way, the injection molding apparatus can mold the structured optical surface of a molded optical part with a much better accuracy, even over a number of injection molding cycles that can reach millions of parts.

In one aspect, there is provided an injection molding apparatus for making an optical part having a structured deflection or reflection optical surface, the injection molding apparatus including: a mold plate, the mold plate including an opening; a mold insert having a reversed structured surface to create the deflection or reflection optical surface of the optical part, the mold insert including at least two mold insert segments, each mold insert segment having a portion of the reversed structured surface and having lateral planar surfaces; a gas venting circuit provided on the lateral planar surfaces of the mold insert segments, the gas venting circuit including a main gas venting conduit and a plurality of secondary gas venting conduits, the plurality of secondary gas venting conduits being in fluid communication with the main gas venting conduit and each of the plurality of secondary gas venting conduits being in fluid communication with the reversed structured surface through corresponding gas venting slits, each gas venting conduit and each gas venting slit having one half on one of the lateral planar surfaces and another haft on the other of the lateral planar surfaces when the mold insert segments are juxtaposed to form the mold insert; and a cooling circuit embedded into the mold insert segments for receiving a liquid coolant, the cooling circuit including cooling conduits located under the reversed structured surface of the mold insert segments to lower the temperature of the mold insert segments and thereby increasing the viscosity of a molten material being injected over the mold insert segments.

In another aspect, there is provided a removable mold insert made of at least two complementary and juxtaposed mold insert segments juxtaposed in a manner that has no impact on the accuracy of the structured optical surface. Each mold insert segment includes a portion of the reversed structured surface. The complementary mold insert segments include lateral planar and smooth surfaces that face each other. They engage each other when they are joined to form the mold insert.

In another aspect, there is provided a mold insert including a main gas venting conduit and a number of secondary gas venting conduits in fluid communication with the main gas venting conduit.

In another aspect, there is provided a main gas venting conduit and secondary venting conduits formed on the lateral surfaces of the mold insert segments. The conduits become fully enclosed or embedded venting conduits by an assembling step and once the two mold insert segments are joined together.

This design of the mold insert made of two or more mold insert segments insures the ability to make/machine/form the gas venting conduits of almost any shape and size and also to dissemble the mold insert to easily clean the gas venting circuit when needed.

In another aspect, there is provided a mold insert including cooling conduits that are at least partially embedded in the mold insert body.

In another aspect, there is provided a mold insert having annular or linearly arranged structural features to generate different optical ray bundles via reflection or deflection.

In another aspect, there is provided a mold insert including secondary gas venting conduits that have gas venting slits at the surface of the mold insert segments. These gas venting slits may have the same size and shape or a different size and shape for the same mold insert or for the same mold insert segment.

In another aspect, there is provided a mold insert is made out of two, three, four or more mold insert segments in order to increase the number of both main and secondary gas venting conduits.

Further details on these aspects as well as other aspects of the proposed concept will be apparent from the following detailed description and the appended figures.

DETAILED DESCRIPTION

Figure 1:
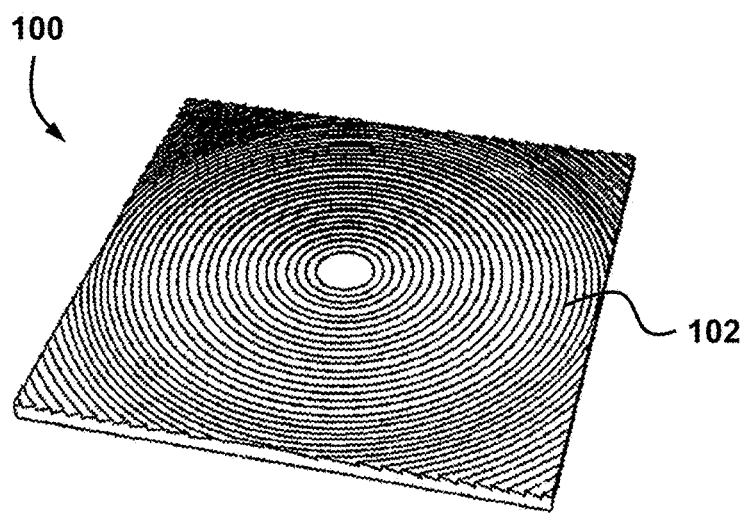
FIG. 1 illustrates an example of a known molded Fresnel lens for sunlight concentrating applications that can be manufactured using the proposed concept.

FIG. 1 illustrates an example of a known molded Fresnel lens 100 for solar concentrating applications that can be manufactured using the proposed concept. This lens 100 includes a structured optical surface 102 made of a plurality of facets. The facets have a concentric circular configuration in the example shown in FIG. 1. However, many variants are possible. The present concept can also be implemented on optical parts that are not Fresnel lenses or that are not even lenses per se.

In FIG. 1, the structured optical surface 102 includes sharp edges and corners between the adjacent facets. The various angles, shapes, width, depth, thickness and radius of the design are specific to the intended use.

The mold cavity in which the optical part is molded includes a mold insert 132 (FIG. 3) forming a negative of the structured optical surface 102 to shape the molten material during cooling. The structured upper optical surface 102 must be as accurate as possible to meet the optical performance for which the lens 100 was designed. Accordingly, high pressures will be maintained during the cooling phase so that the structured optical surface 102 be as close as possible to the intended design.

Figure 2:
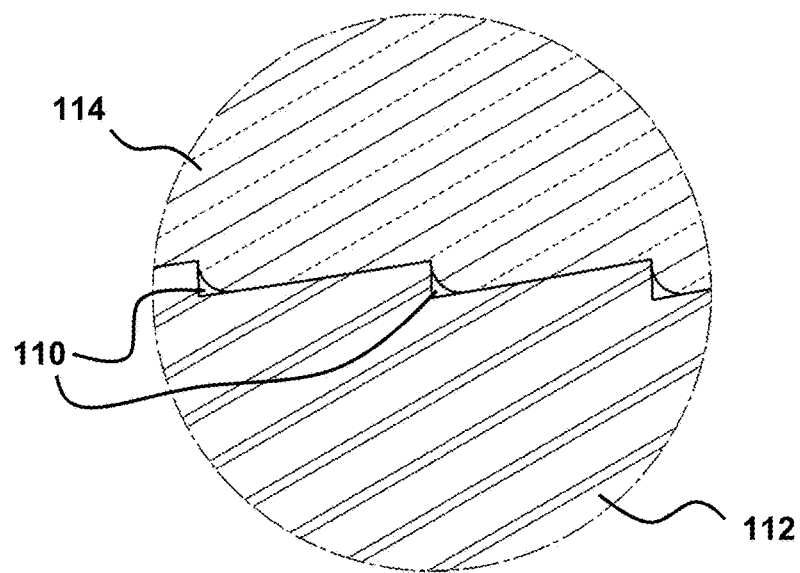
FIG. 2 is a cross-sectional view depicting an example of gas pockets trapped between the mold insert and the molten material during molding.

FIG. 2 is a cross-section view depicting an example of gas pockets 110 trapped between a mold insert 112 and the molten material 114 that will form the optical part, for instance the lens 100 of FIG. 1. As can be seen, the gas pockets 110 are at the bottom edge between two adjacent ones of the facets. Since the molten material fills the rest of the mold cavity, they cannot escape from their current location. Their presence prevents the molten material from reaching the bottom of the sharp corners at the edge between two adjacent facets. Some of the precision of the molding is thus lost and the resulting optical performance of the optical part may be lower than the expectations. The proposed concept addresses this challenge.

Figure 3:
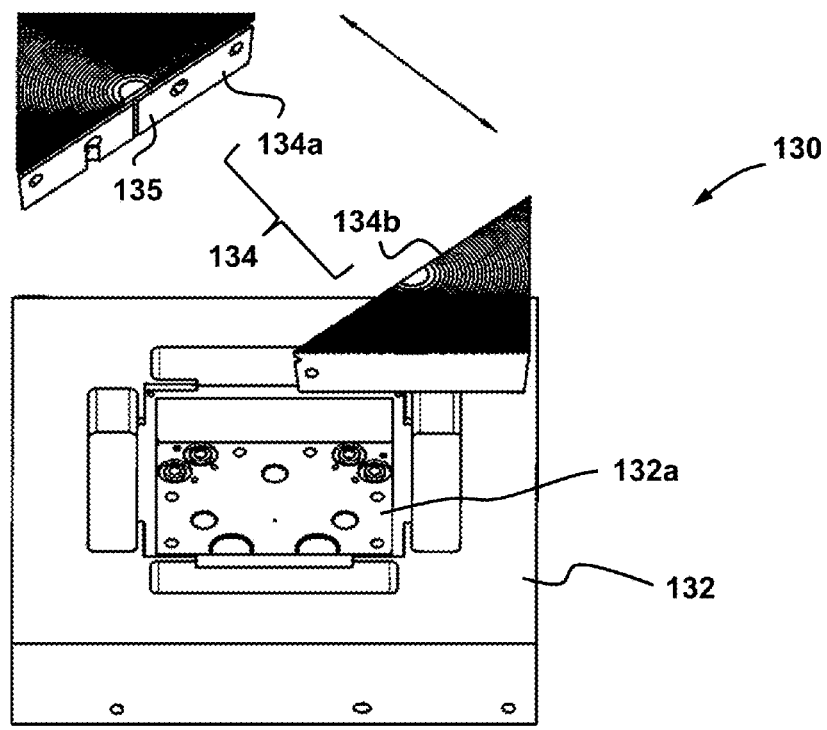
FIG. 3 is an isometric and exploded view illustrating an example of an injection-molding apparatus using the proposed concept.

FIG. 3 is an isometric and exploded view illustrating an example of an injection-molding apparatus 130 using the proposed concept. It should be noted that in FIG. 3, as well as in some of the other figures, the other usual components of an injection-molding apparatus 130 have been omitted for the sake of clarity. These other components are known to those skilled in the art and need not be discussed herein.

The injection molding apparatus 130 includes a mold plate 132 and a mold insert 134. The mold insert 134 includes two complementary segments 134a, 134b in the illustrated example. These mold insert segments 134a, 134b are designed to be juxtaposed at mating lateral surfaces 135 and then inserted very tightly inside an opening 132a on the mold plate 132. The top surfaces of the mold insert segments 134a, 134b, when they are juxtaposed, will form the reversed structured surface 136 over which the structured optical surface 102 of the optical part will be formed.

Figure 4:
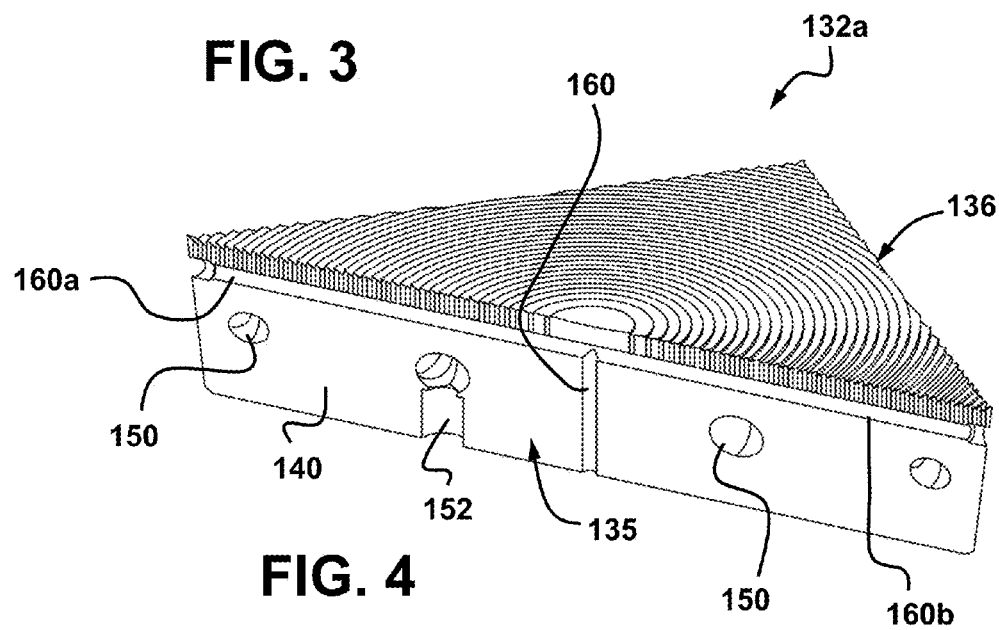
FIG. 4 is an enlarged isometric view of one of the two mold insert segments in FIG. 3.

FIG. 4 is an enlarged isometric view of one of the two mold insert segments 134a, 134b in FIG. 3. The other mold plate segment 134b is substantially a mirror image of the one shown in FIG. 4. As can be seen, the reversed structured surface 136 on the mold plate segment 134a is located over a main body 140 inside which cooling conduits 150 are provided. The cooling conduits 150 are part of a cooling circuit in which a liquid coolant flows during the injection-molding process to lower the temperature of the molten material injected into the mold cavity. The cooling conduits 150 are in fluid communication with corresponding ports, for instance ports provided at the bottom or on the side of the opening 132a of the mold plate 132.

FIG. 4 further shows an opening 152 used to place a securing element provided so as to lock the mold insert segments 134a, 134b into the mold plate 132. Also, a removing tool (not shown) can be introduced in the opening 152 to push the mold insert segments 134a, 134b out for servicing. Variants are possible as well.

Figure 5:
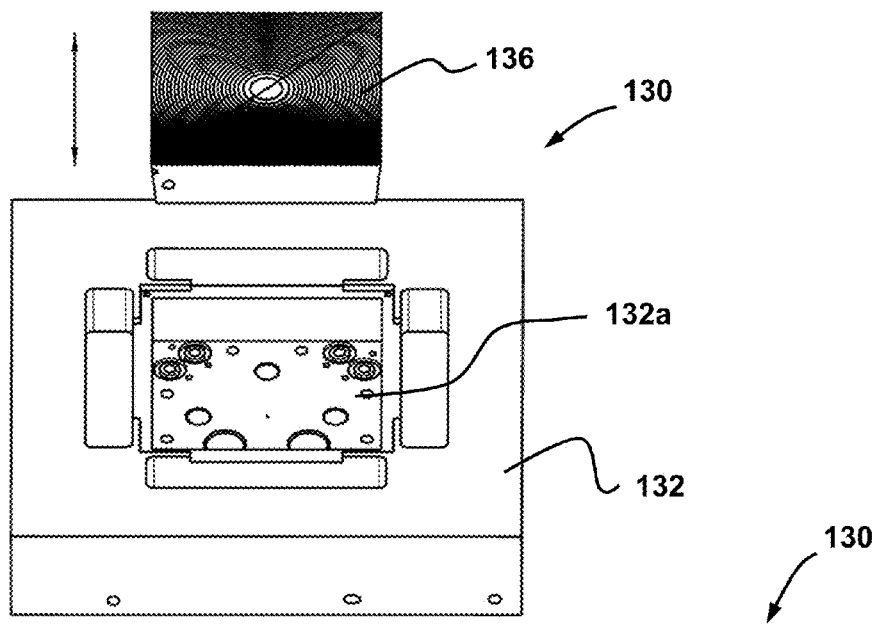
FIG. 5 is a view similar to FIG. 3, showing the two mold insert segments juxtaposed prior to their insertion into the opening on the mold plate.

FIG. 5 is a view similar to FIG. 3, showing the two mold insert segments 134a, 134b juxtaposed prior to their insertion into the opening 132a of the mold plate 132.

Figure 6:
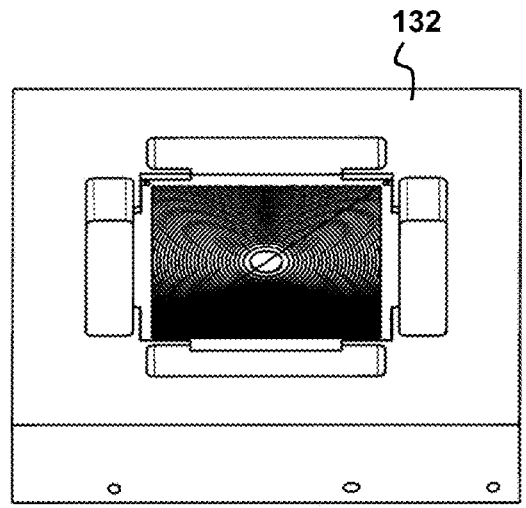
FIG. 6 is a view similar to FIG. 3, showing the two mold insert segments once inserted into the opening on the mold plate.
Figure 7:
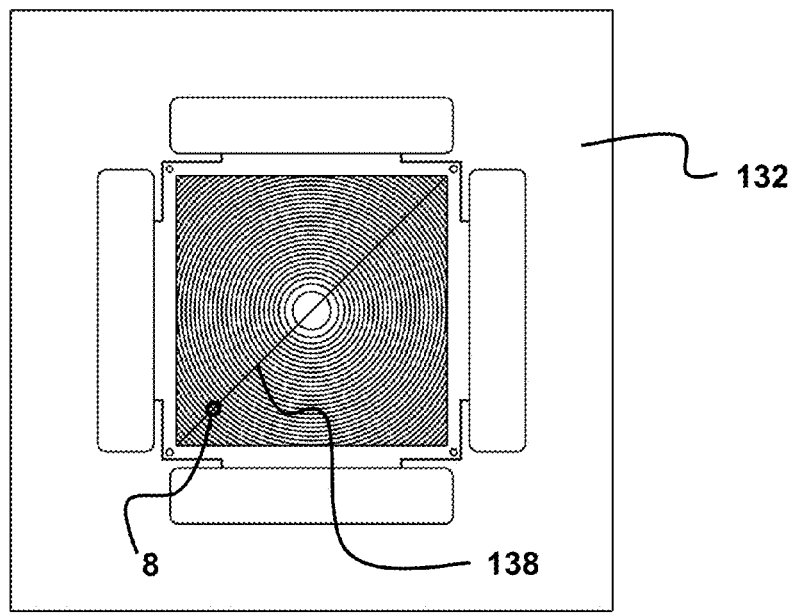
FIG. 7 is a top view of what is shown in FIG. 6.

FIG. 6 is a view similar to FIG. 3, showing the two mold insert segments 134a, 134b once inserted into the opening 132a of the mold plate 132. FIG. 7 is a top view of what is shown in FIG. 6. The mold insert 134 is then located deep into the opening 132a and the reversed structured surface 136 is then lower that the top edge of the opening 132a. The space above the reversed structured surface 136 will form the mold cavity. It will be closed on the top side by another part (not shown) of the injection molding apparatus 130.

As best shown in FIG. 4, the mold insert segments 134a, 134b each include one half of a gas venting circuit designed to give at least one direct access along each one of the bottom edges on the reversed structured surface 136 where a gas pocket can form. In the illustrated example, the gas venting circuit includes a T-shaped main gas venting conduit 160 formed and/or machined on the lateral surfaces 135 of the mold insert segments 134a, 134b. The main gas venting conduit 160 includes an outlet portion (vertical in the figures) leading to two side portions 160a, 160b. The outer ends of side portions 160a, 160b can be closed by corresponding plugs or the like.

In other implementations, the main gas venting conduit 160 can have an L shape, an H shape or an X shape as it would be seen in a lateral cross section on the lateral surfaces 135. Other variants are possible as well.

Figure 9:
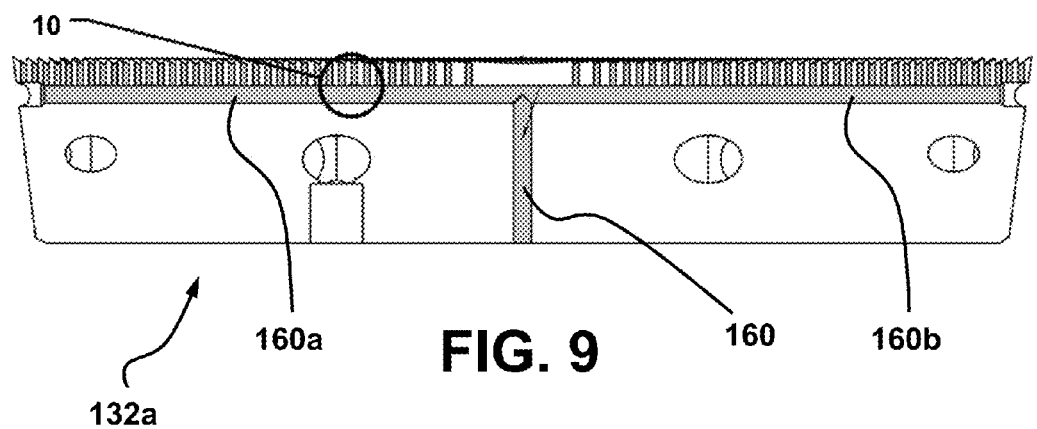
FIG. 9 is a side view of the mold insert segment shown in FIG. 4.
Figure 10:
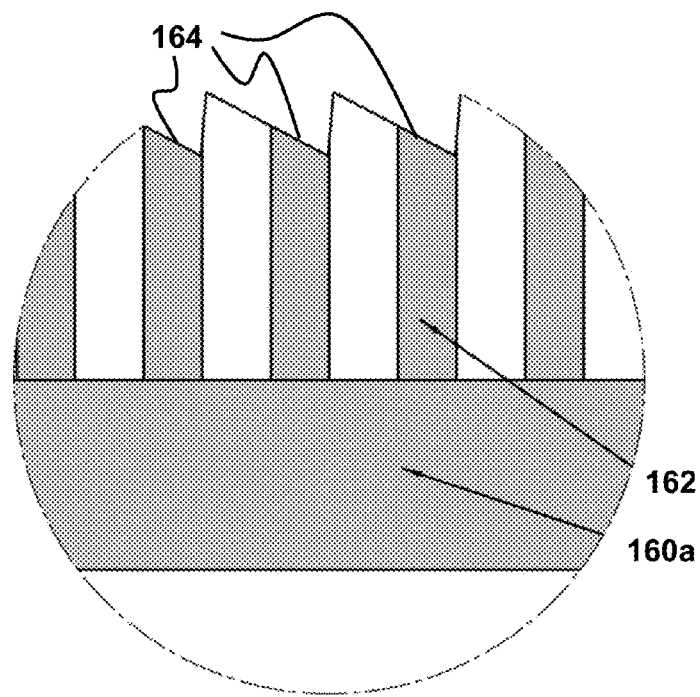
FIG. 10 is an enlarged side view showing some of the secondary gas venting conduits in FIG. 9.

The main gas venting conduit 160 is in fluid communication with a plurality of secondary gas venting conduits 162. These secondary venting conduits 162 are shown for instance in FIGS. 9 and 10. FIG. 9 is a side view of the mold insert segment 134a shown in FIG. 4. FIG. 10 is an enlarged side view showing some of the secondary gas venting conduits 162 in FIG. 9. It should be noted that in FIG. 10, the grayed regions represent the parts of the gas venting circuit.

The secondary venting conduits 162 are formed and/or machined directly on the lateral surfaces 135 of the mold insert segments 134a, 134b, just under the reversed structured surface 136. They each extend between a corresponding facet and the main gas venting conduit 160. The junction between each of the secondary venting conduits 162 and the reversed structured surface 136 is in the form of a gas venting slit 164 when viewed from above.

Figure 8:
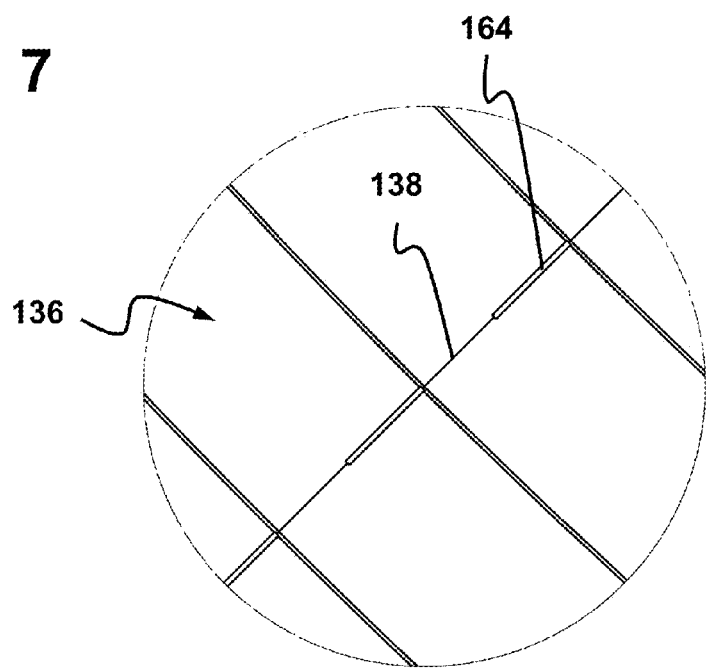
FIG. 8 is an enlarged top view showing some of the gas venting slits of FIG. 7.
Figure 11:
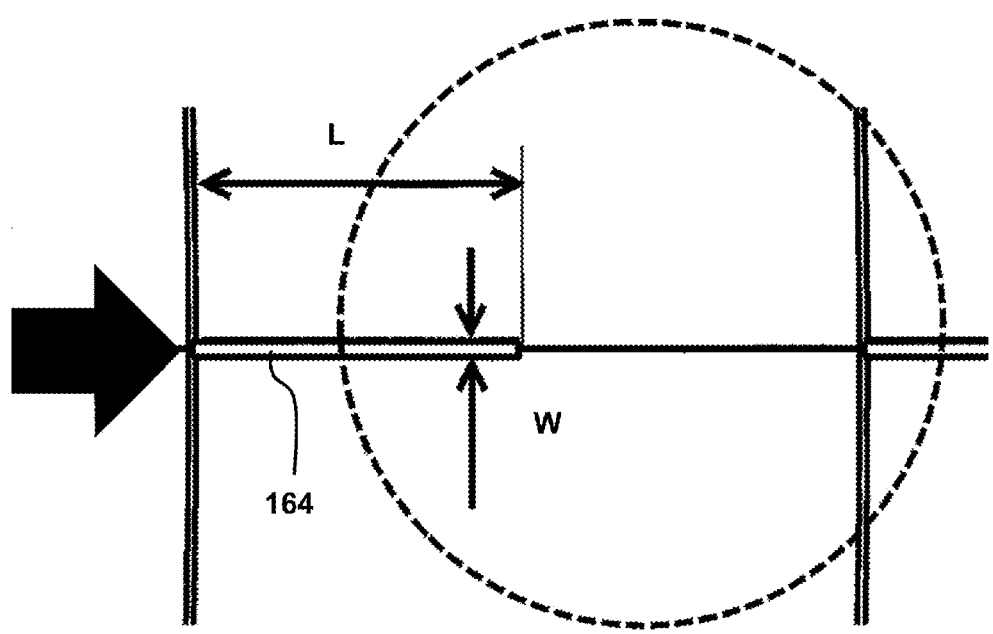
FIG. 11 is schematic top view of a gas venting slit.

FIG. 8 is an enlarged top view showing some of the gas venting slits 164 of FIG. 7. As can also be seen, the junction between the two mold insert segments 134a, 134b forms a junction line 138 on the reversed structured surface 136. The gas venting slits 164 are formed and/or machined along the top edge of this line 138. The slits 164 have an elongated venting aperture (L x W) oriented on a direction of the melt flow in the mold cavity that allows the gas present and/or formed in the mold cavity to escape during the filling of the mold cavity over the length L and the width W of the gas venting slit 164, as shown for instance in FIG. 11. FIG. 11 is schematic top view of a gas venting slit 164. It should be noted that the proportions of the slits 164 in the figures are not to scale.

The gas venting slits 164 are made narrow enough to prevent the molten material from entering. This is due to the viscosity of the molten material and the surface tension. For example, in implementations for making the optical parts made of Poly(methyl methacrylate) (PMMA), the gas venting slits 164 can be about 40 to 50 µm in width by 2 mm in length and oriented to allow the gas to exit in front of the melt flow indicated by the large arrow.

The gas venting slits 164 also have a length that is less than the distance between two adjacent edges along the line 138. Still, the bottom end of the gas venting slits 164 can be in alignment with the edge.

The gas venting conduits 162, 162 and the gas venting slits 164 are fully formed when the mold insert segments 134a, 134b are brought and secured together. There are no conduits in this gas venting circuit that are embedded into the mold insert segments 134a, 134b when they are separated. Thus, it is easier to clean. Cleaning can be required after some time since the vented gas may carry droplets of the molten material and/or other debris that can accumulate inside the gas venting circuit. The shape and size of the conduits can also be made and/or modified relatively easily since they are present only on the lateral surfaces 135.

In use, the gas venting circuit can be at a negative pressure during the molting process. There are also gas venting slits 154 at each one of the edges. The intense pressure from the molten material and the negative pressure in the gas venting circuit provide the right conditions for venting the small gas pockets and allow the molten material to reach the bottom of the edges between the adjacent facets.

The injection molding apparatus 130 can include ejecting channels used to accommodate ejection pins (not shown) to remove the molded optical parts from the mold cavity after each optical part is cooled in the mold closed position.

The mold insert segments 134a, 134b are made and split from the beginning Next, there is a step of cutting/forming/machining the reverse structured surface 136 on the mold insert segments 134a, 134b. Next, all the gas venting conduits 160, 162 and the gas venting slits 164 are made at the dimensions and shape required for each application. Next the mold insert segments 134a, 134b are put together and there is a precise grinding/forming/machining of the contour and lateral surfaces. The contour surface will provide a joining force to keep the mold insert segments 134a, 134b in place and in contact and to fully enclose the gas venting circuit. This will also give the repeatable orientation when there is a need to disassemble and clean the gas venting circuit. The final step is to perform the final machining of the reversed structured surface 136, such as for example diamond cutting the Fresnel shape (annular or linear) in the assembled position of the mold insert segments 134a, 134b.

If the reversed structure surface 136 is formed by diamond cutting with a targeted roughness Ra=(0.5 to 5) nm it is possible to eliminate the diamond left lines by polishing to achieve the desired Ra for most applications in the range of Ra=(0.8 to 1) nm. In order to achieve on the optical part the highly accurate angles the minimum radius can be in the range of (1-5) µm when using for example a 5-axes commercially available machine.

Figure 12:
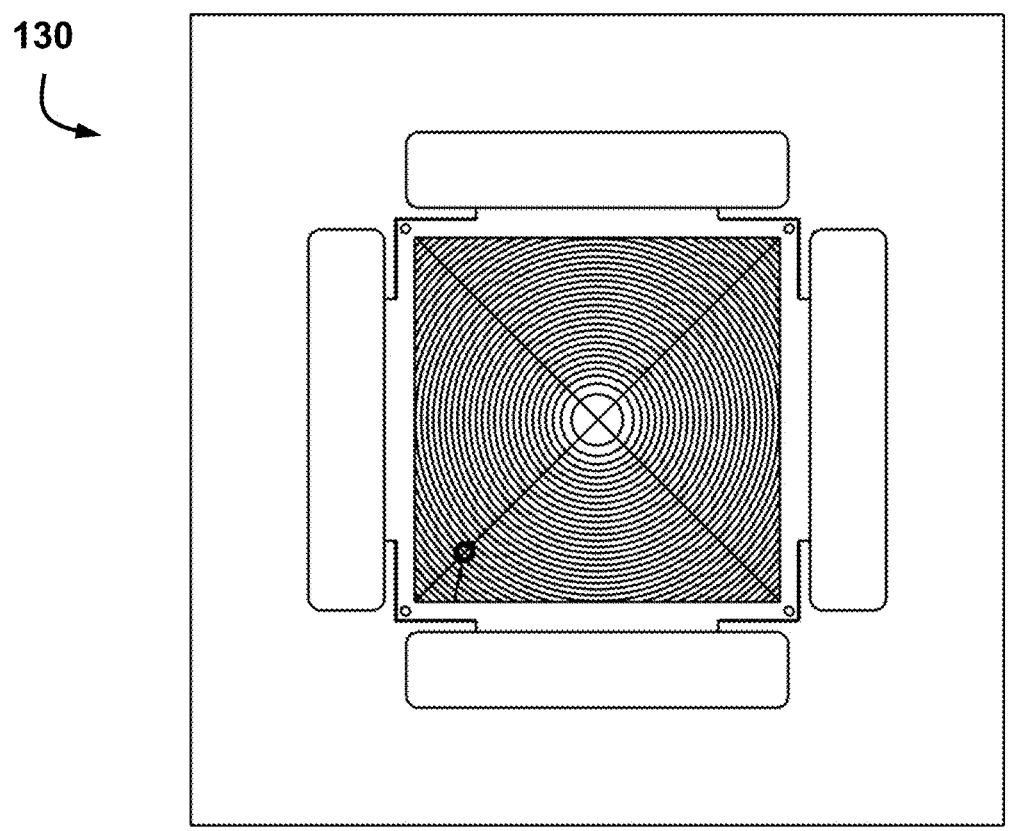
FIG. 12 is a view similar to FIG. 7 but showing an example of a mold insert having four segments.

If there is a need for more gas venting slits 164, the mold insert 134 can be made of more than two mold insert segments. These multiple mold insert inserts with increased venting capacity. For instance, FIG. 12 is a view similar to FIG. 7 but it illustrates an example of a mold insert 134 having four mold plate segments. Variants are possible as well.

Figure 13:
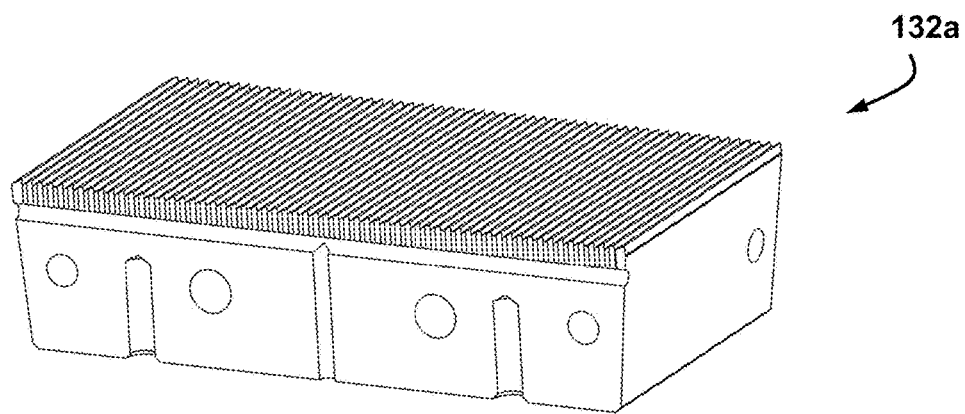
FIG. 13 is an isometric view illustrating an example of a mold insert segment for an optical part having a structured optical surface that includes linear facets extending substantially parallel to one another.

FIG. 13 is an isometric view illustrating an example of a mold insert segment 134a for an optical part where the reversed structured surface 136 includes facets that are extending substantially parallel to one another. Such linear surface can be used to manufacture lenses for flat displays or the like. Variants are possible as well.

Figure 14:
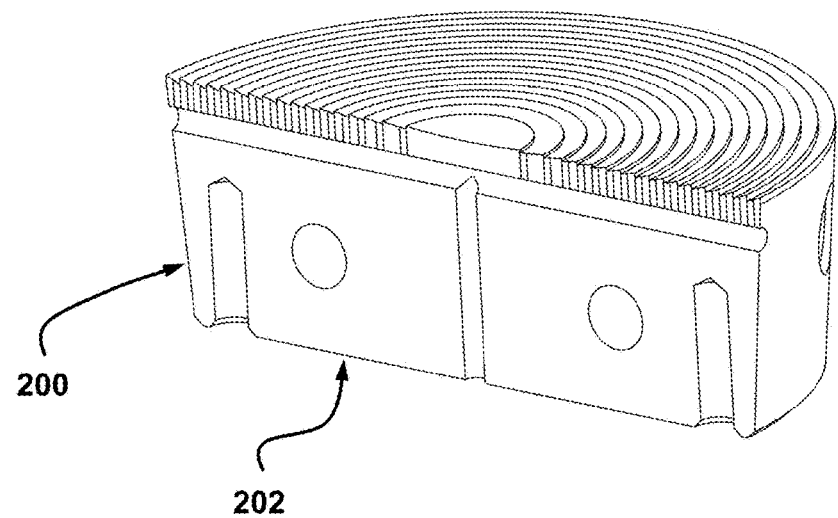
FIG. 14 is an isometric view illustrating an example of a mold insert segment forming a circular mold insert when juxtaposed to its opposite half.

FIG. 14 is an isometric view illustrating an example of a mold plate segment 134a forming a circular mold plate when juxtaposed with the other half. This mold insert segment 134a includes a conical or a tapered contour surface 200 used to locate and join the two mold insert segments in proper alignment and in tight contact. The bottom surface 202 of this mold insert 134a allows also for defining the depth of the mold cavity and also to push the mold insert segments upwards in order to dissemble them for servicing the gas venting conduits.

The present detailed description and the appended figures are meant to be exemplary only, and a skilled person will recognize that variants can be made in light of a review of the present disclosure without departing from the proposed concept.

What is claimed is:

1. An injection molding apparatus for making an optical part having a structured deflection or reflection optical surface, the injection molding apparatus including:
   a mold plate, the mold plate including an opening;
   a mold insert having a reversed structured surface to create the deflection or reflection optical surface of the optical part, the mold insert including at least two mold insert segments, each mold insert segment having a portion of the reversed structured surface and having lateral planar surfaces;
   a gas venting circuit provided on the lateral planar surfaces of the mold insert segments, the gas venting circuit including a main gas venting conduit and a plurality of secondary gas venting conduits, the plurality of secondary gas venting conduits being in fluid communication with the main gas venting conduit and each of the plurality of secondary gas venting conduits being in fluid communication with the reversed structured surface through corresponding gas venting slits, each gas venting conduit and each gas venting slit having one half on one of the lateral planar surfaces and another haft on the other of the lateral planar surfaces when the mold insert segments are juxtaposed to form the mold insert; and
   a cooling circuit embedded into the mold insert segments for receiving a liquid coolant, the cooling circuit including cooling conduits located under the reversed structured surface of the mold insert segments to lower the temperature of the mold insert segments and thereby increasing the viscosity of a molten material being injected over the mold insert segments.

2. The injection molding apparatus according to claim 1, wherein the gas venting slits are rectangular in shape and are oriented parallel to a melt flow in the mold cavity.

3. The injection molding apparatus according to claim 2, wherein each of the gas venting slits has one end positioned adjacent to an edge between two adjacent facets of the reversed structured surface and extends perpendicularly with reference to the edge.

4. The injection molding apparatus according to claim 3, wherein there is at least one of the gas venting slits adjacent to each one of the edges of the reversed structured surface.

5. The injection molding apparatus according to claim 1, wherein each of the gas venting slits has one end positioned adjacent to an edge between two adjacent facets of the reversed structured surface and extends perpendicularly with reference to the edge.

6. The injection molding apparatus according to claim 1, wherein the gas venting slits are rectangular in shape.

7. The injection molding apparatus according to claim 1, wherein there is at least one of the gas venting slits positioned adjacent to an edge between a pair of adjacent facets of the reversed structure, all edges between the pairs of adjacent facets being adjacent to at least one of the gas venting slits.

8. The injection molding apparatus according to claim 7, wherein the gas venting slits are rectangular in shape.

9. The injection molding apparatus according to claim 1, wherein the mold insert segments of the mold insert are only two in number, each mold insert segment having a corresponding half of the reversed structured surface, the gas venting slits extending along a junction line formed between the two mold insert segments when the two mold insert segments are juxtaposed.

10. The injection molding apparatus according to claim 9, wherein the gas venting slits are rectangular in shape.

11. The injection molding apparatus according to claim 9, wherein there is at least one of the gas venting slits positioned adjacent to an edge between a pair of adjacent facets of the reversed structure, all edges between the pairs of adjacent facets being adjacent to at least one of the gas venting slits.

12. The injection molding apparatus according to claim 1, wherein the reversed structured surface includes facets having a concentric circular configuration.

13. The injection molding apparatus according to claim 12, wherein the gas venting slits are rectangular in shape.

14. The injection molding apparatus according to claim 13, wherein the optical part with the structured optical surface to be formed by the concentric circular configuration of the reversed structured surface is a Fresnel lens.

15. The injection molding apparatus according to claim 1, wherein on each of the mold insert segments, the reversed structured surface includes a plurality of facets that are linear and parallel to one another.

16. The injection molding apparatus according to claim 15, wherein the gas venting slits are rectangular in shape.

17. The injection molding apparatus according to claim 16, wherein the optical part with the structured optical surface to be formed by the plurality of facets of the reversed structured surface that are linear and parallel to one another is a Fresnel lens.

* * * * *